United States Patent [19]

Ralls

[11] Patent Number: 5,676,095
[45] Date of Patent: Oct. 14, 1997

[54] PROTECTIVE PAW COVERINGS FOR ANIMALS

[76] Inventor: Julie Robin Ralls, 620 Begonia Ave., Corona del Mar, Calif. 92625

[21] Appl. No.: 685,682

[22] Filed: Jul. 24, 1996

[51] Int. Cl.⁶ .................................................. A01K 13/00
[52] U.S. Cl. ................................................... 119/850
[58] Field of Search ............................. 119/850; 54/82, 54/80.1, 79.3, 79.2, 79.1, 65, 68

[56] References Cited

U.S. PATENT DOCUMENTS

| | | |
|---|---|---|
| 601,974 | 4/1898 | Meissner ........................... 54/82 |
| 3,476,108 | 11/1969 | Matukas . |
| 3,741,207 | 6/1973 | Fuson . |
| 3,747,565 | 7/1973 | Kellam . |
| 3,774,242 | 11/1973 | Owen . |
| 4,633,817 | 1/1987 | Taylor . |
| 4,744,333 | 5/1988 | Taylor . |
| 4,815,480 | 3/1989 | Martin . |
| 4,934,321 | 6/1990 | Madsen . |
| 5,076,043 | 12/1991 | Butler ................................. 119/850 |
| 5,341,765 | 8/1994 | McComb ........................... 54/79.2 X |
| 5,495,828 | 3/1996 | Solomon et al. ................. 119/850 |
| 5,540,189 | 7/1996 | Massom ............................. 119/850 |

*Primary Examiner*—Thomas Price
*Attorney, Agent, or Firm*—Knobbe, Martens, Olson & Bear, LLP

[57] ABSTRACT

A protective paw covering which prevents damage caused by animal claws is disclosed. The paw covering includes first and second boots which are designed to fit over the front paws of the animal. The boots are secured on the animal by a harness which includes a first set of straps attached to the first boot and a second set of straps attached to the second boot. Each strap in the first set is secured to a corresponding strap in the second set to prevent removal of the boots by the animal. The harness may include an additional strap connecting the first and second sets of straps. The harness may be attached to a collar worn around the neck of the animal.

4 Claims, 3 Drawing Sheets

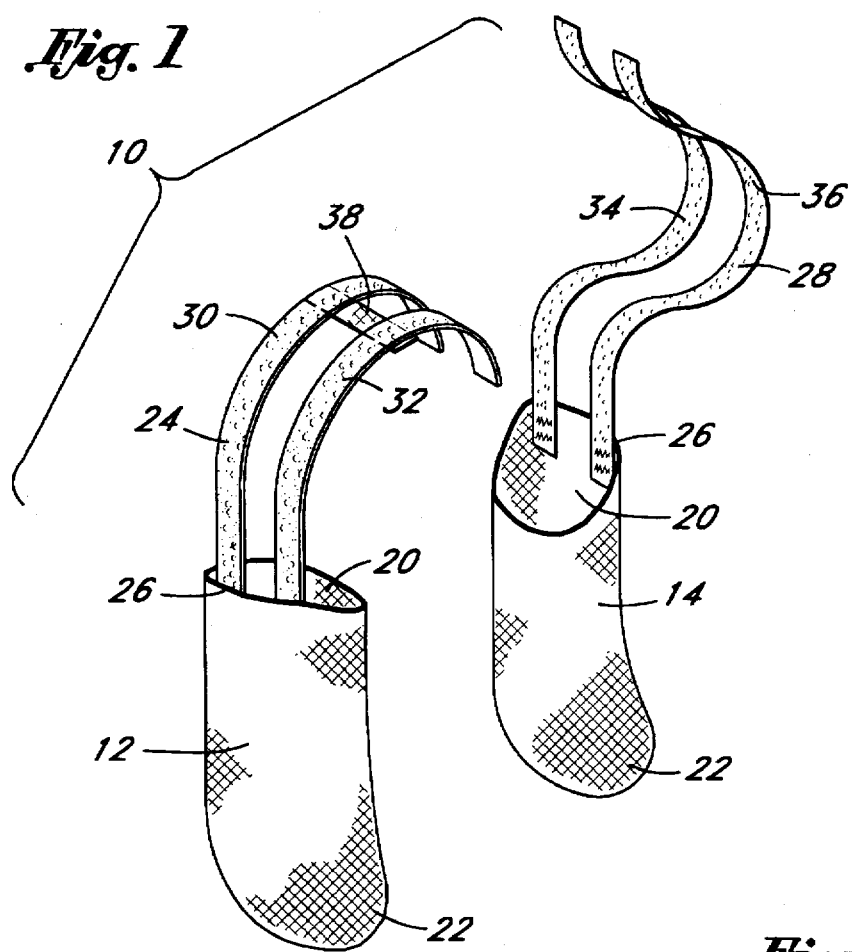
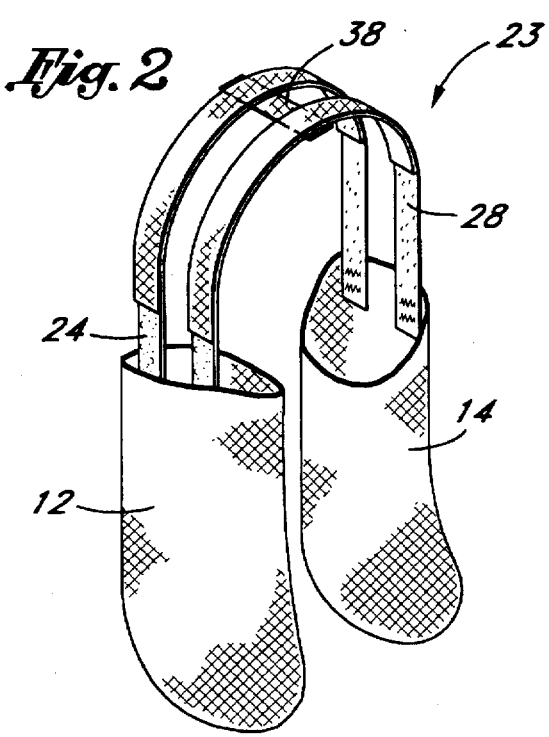
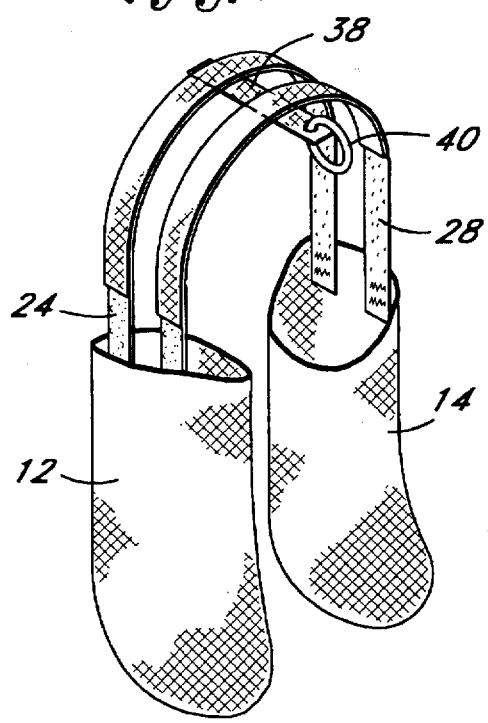

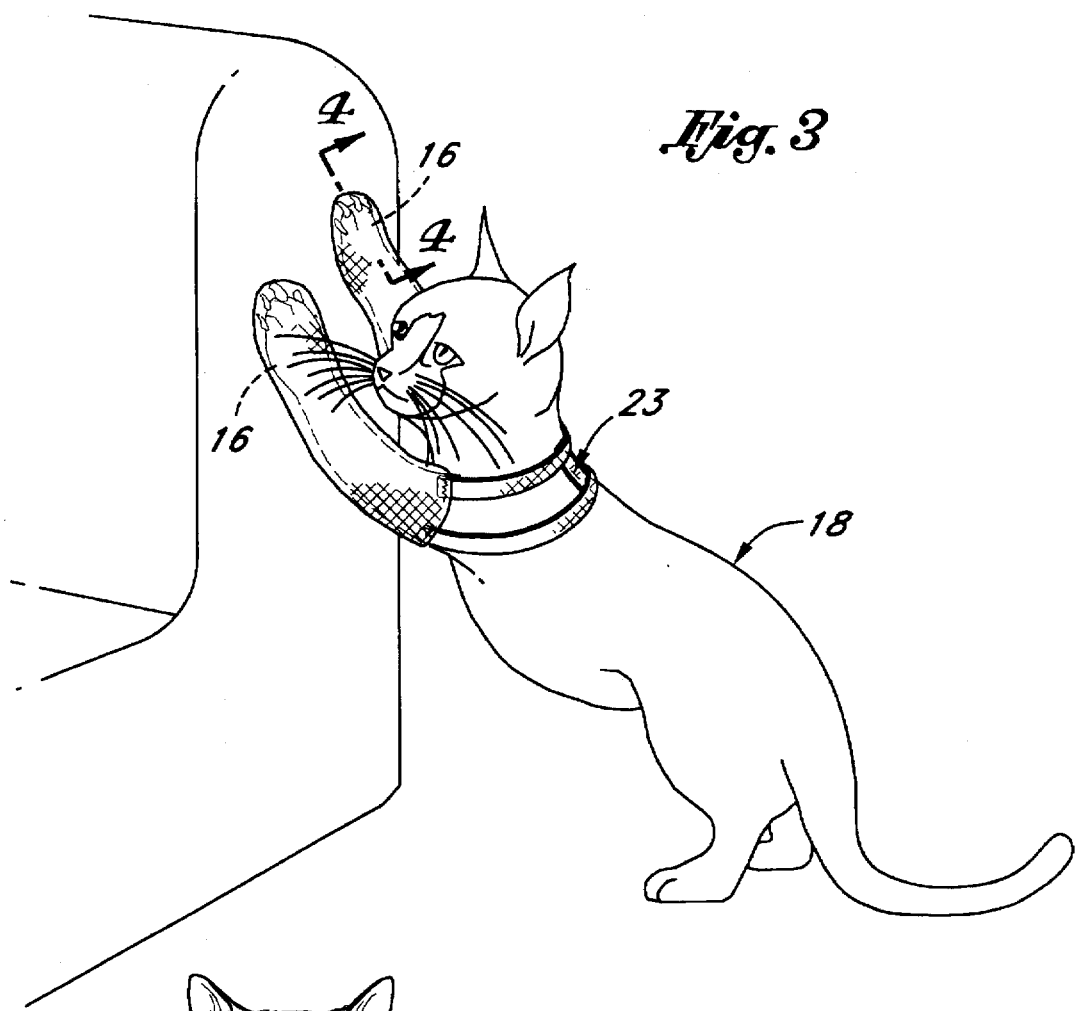
*Fig. 3*
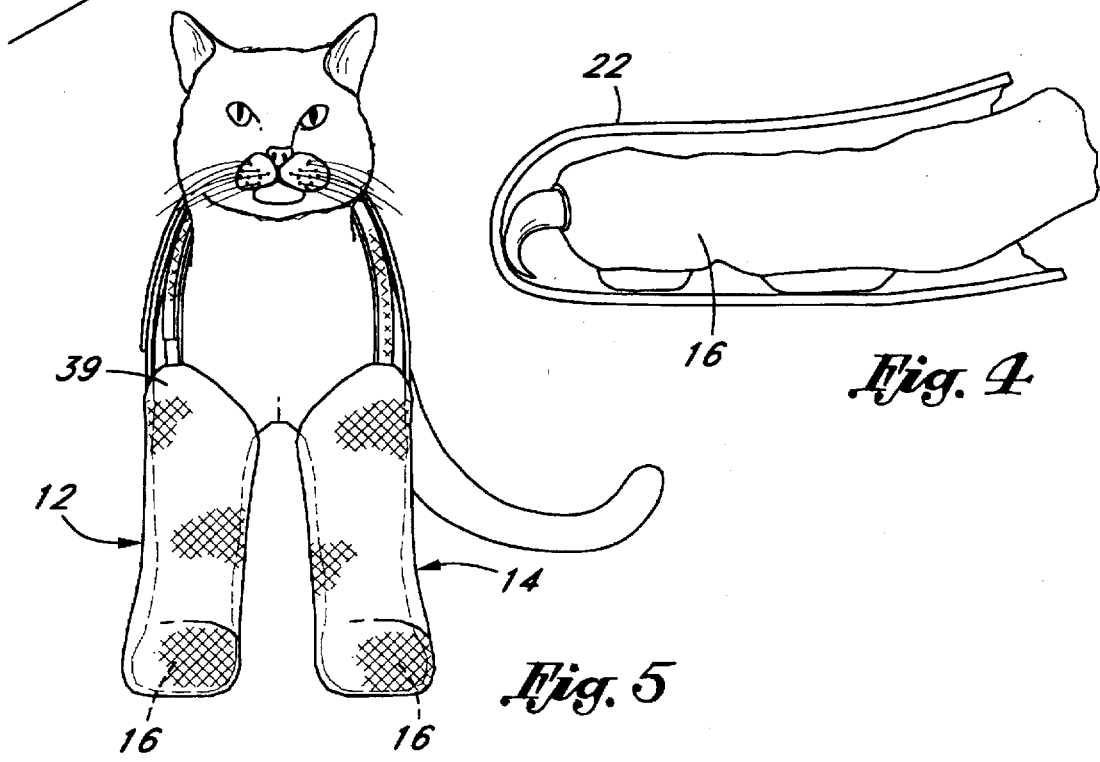
*Fig. 4*
*Fig. 5*

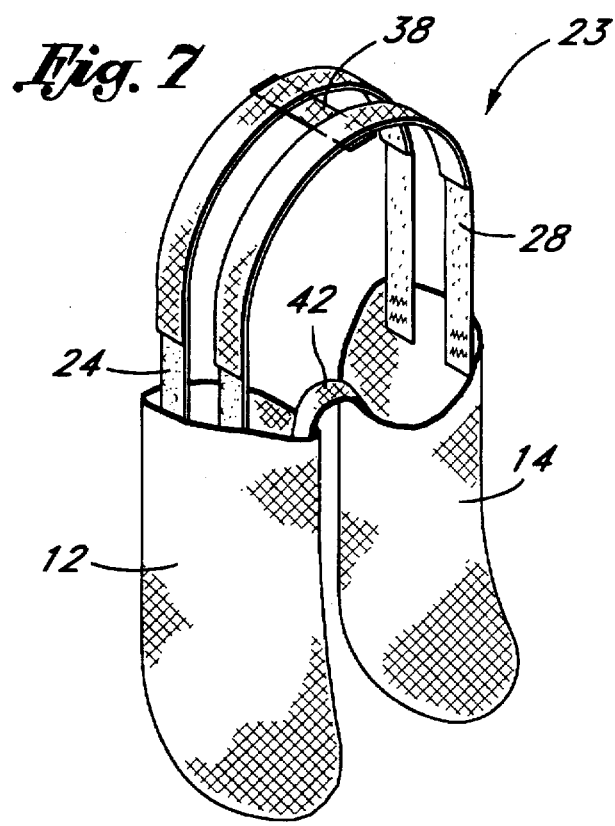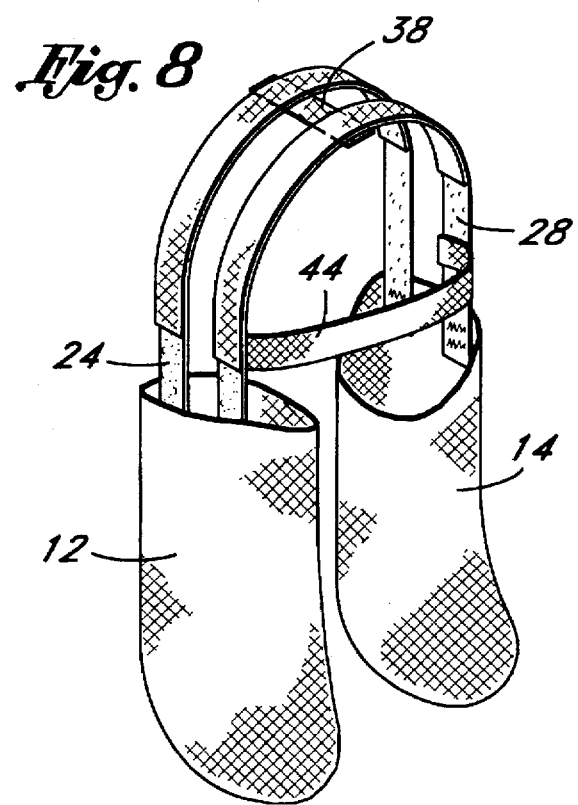

PROTECTIVE PAW COVERINGS FOR ANIMALS

FIELD OF THE INVENTION

The invention relates to an article of clothing for animals and, in particular, to covers which fit over the paws of an animal to protect people and articles from damage caused by animal claws.

BACKGROUND OF THE INVENTION

It is well known that the claws of domestic dogs and cats often cause damage to household articles such as draperies and furnishings. Cats in particular claw and scratch against furniture and are often declawed for this reason. Declawing is associated with many disadvantages when the cat is outdoors. For example, the claws help the cat climb and without them, the cat has limited mobility. Further, without its claws, the cat is left defenseless in fights with other animals.

Devices have been developed which cover the paws of an animal. For example, U.S. Pat. No. 3,747,565 to Kellam discloses an article of animal apparel including a pair of boots adapted to be worn on the animal's paws to facilitate bathing. The boots are encompassed within mesh sleeves which are tied across the back of the animal. These boots are not suited for long-term wear by the animal, however, as the tie may easily come undone, enabling the animal to chew or pull at the boots in order to remove them. In addition, the mesh sleeves may be ripped or torn during use by an animal, providing access to the boots. Further, an animal may be able to remove the mesh sleeves by pulling the tied string over its head.

U.S. Pat. No. 4,633,817 to Taylor discloses another type of protective footwear including a suspender system for retaining two-piece bootees on an animal's feet. Front and back straps adapted to drape over the animal's shoulders and hindquarters are attached to buckles on the bootees. An adjustable strap extends longitudinally across the back of the animal and joins the front and back straps. These bootees could be removed by the animal by chewing or pulling at the straps attached to the buckles. Animals can easily access their back legs with their mouths and chew on the straps, buckles or bootees. The buckles also may be uncomfortable to the animal when laying down, which would further cause the animal to attempt to remove the bootees, buckles or straps.

SUMMARY OF THE INVENTION

The present invention provides protective paw coverings which cannot be removed by an animal by mere pulling or chewing. The coverings are secured on the animal by first and second sets of straps wherein each strap in the first set is secured to a corresponding strap in the second set. The coverings are easy to use and are secured on the animal by simply placing the covers over the animal's paws and securing the straps across the animal's back. The coverings extend over the entire length of the animal's leg to ensure that the animal cannot simply step out of the coverings while they are being secured and further prevent the coverings from being pulled off by the animal once the straps have been joined. The coverings are preferably rounded to conform to the shape of the paw and to snugly fit around the paw such that the coverings do not interfere with the animal's movements and are comfortable during wear.

One aspect of the invention is a set of coverings for protecting animal paws and preventing damage caused by the paws. The coverings comprise a first boot which covers a first front paw of an animal wherein the first boot has a first set of straps secured to an outer edge thereof. A second boot covers a second front paw of the animal and has a second set of straps secured to an outer edge thereof. Each strap in the first set of straps may be secured to a corresponding strap in the second set of straps to prevent removal of the boots by the animal. The first set of straps may comprise strips of hook material and the second set of straps may comprise strips of loop material. The coverings may further include a connecting strap secured between a midpoint of the straps in the first or second sets of straps. The coverings may also include a ring connected to the first or second set of straps, wherein the ring is further connected to a collar worn by the animal to prevent removal of the coverings. In addition, a third strap may connect the first and second sets of straps. The boots may have an open top end and a closed bottom end shaped to conform to the shape of the paws.

The invention further provides coverings for protecting animal paws and preventing damage caused by paws comprising first and second paw covers having an open top end and a closed, rounded bottom end which generally conforms to the shape of the paws. A harness secures the paw covers on the animal. The harness includes a first set of straps attached to the first paw cover and a second set of straps attached to the second paw cover, wherein the first set of straps may be secured to the second set of straps. The first set of straps may comprise strips of hook material and the second set of straps may comprise strips of loop material. The harness may further include a connecting strap secured between the straps in the first or second sets of straps. The harness may also include a ring connected to the first or second sets of straps, wherein the ring is further connected to a collar worn by the animal to prevent removal of the paw covers.

BRIEF DESCRIPTION OF THE DRAWINGS

FIG. 1 is a perspective view illustrating first and second paw covers in accordance with the present invention;

FIG. 2 is a perspective view of the paw covers when secured to one another;

FIG. 3 is a perspective view of the paw coverings worn by a cat;

FIG. 4 is an enlarged cross-sectional view of the bottom end of the boot illustrating the paw inside the boot taken through line 3—3 of FIG. 3;

FIG. 5 is a front view of the paw coverings on the cat;

FIG. 6 is a perspective view of an alternative embodiment of the paw covers including a ring for attachment to an animal collar;

FIG. 7 is a perspective view of another alternative embodiment of the paw covers including an inner strap; and FIG. 8 is a perspective view of yet another alternative embodiment of the paw covers including a cross strap.

DETAILED DESCRIPTION OF THE INVENTION

FIGS. 1–3 illustrate paw coverings 10 constructed in accordance with the present invention. The paw coverings 10 include first and second protective boots 12, 14 which fit over the front paws 16 of an animal, such as a cat 18. The boots 12, 14 preferably have an open top end 20 and a closed bottom end 22. The bottom end 22 of each boot 12, 14 is preferably rounded to conform to the shape of the paw 16 and to snugly fit around the paw such that the coverings do not interfere with the animal's movements. See FIG. 4.

A harness 23 secures the boots 12, 14 on the animal 18. The harness 23 preferably comprises a first set of straps 24 attached to an edge 26 of the top end 20 of the first boot 12 and a second set of straps 28 attached to an edge 26 of the top end 20 of the second boot 14. The straps 24, 28 are preferably attached to the boots 12, 14 by stitching using a heavy thread that resists tearing and pulling by the animal. Other attachment means that securely attach the straps to the boots may also be used as will be readily understood by those of skill in the art.

In the preferred embodiment, the first set of straps 24 comprises two strips 30, 32 of loop material and the second set of straps comprises two strips 34, 36 of hook material, however, other durable materials such as nylon or canvas may also be used. A connecting strap 38, which may be formed of nylon or any other durable material may be secured at approximately the midpoint of either set of straps 24, 28. Preferably, the connecting strap extends generally perpendicularly between the straps as shown in FIGS. 1–3.

Referring to FIG. 5, in use, the animal's front paws 16 are inserted into the boots 12, 14. The boots 12, 14 are constructed of a durable material, such as rayon or leather, which is long-wearing and which is also strong enough to resist piercing by the claws. Each boot 12, 14 preferably extends upwardly from the paw 16 to the shoulder 39 of the animal 18, thereby covering the entire length of the animal's leg. The length of the boots 12, 14 ensures that the animal cannot step out of the boots 12, 14 when the coverings 10 are being put on the animal and further prevents the boots from being pulled off by the animal once the paw covers have been secured.

Next, the first set of straps 24 is placed across the back of the animal. As best illustrated in FIGS. 1 and 2, the straps are preferably long enough so that when in place on the animal 18, each set of straps 24, 28 extends upwardly from the boot across the back of the animal, terminating adjacent the opposite boot. To join the straps, the strips of hook material 34, 36 in the second set 28 are placed over the corresponding strips of loop material 30, 32 in the first set 24. The strips of loop material are preferably positioned underneath the strips of hook material, i.e., with the strips of loop material facing upwards, away from the animal, so that the loop material does not become entangled with the animal's fur. The hook and loop strips 30, 32, 34, 36 are then pressed together to secure the straps 24, 28 and retain the boots 12, 14 on the animal as will be easily understood by those of skill in the art. Alternatively, the hook material may be placed on the first set of straps and the loop material may be placed on the second set of straps.

When joined in this manner, the second set of straps 28 may be secured substantially across the entire length of the first set of straps 24. This maximizes the length over which the straps are secured, making it more difficult for the animal to remove the boots 12, 14. Of course, the exact length across which the straps 24, 28 are secured to one another will vary depending upon the size of the animal 18. However, it is preferable that the second set of straps 28 be secured across a substantial portion of the length of the first set of straps 24 to inhibit removal of the covering 10 by the animal 18 in use. Other attachment means for attaching straps 24, 28, such as snaps, hook and eye closures, buttons, or even safety pins, may also be used to join the straps as will be easily understood by those of skill in the art. The connecting strap 38 also acts to prevent removal of the boots 12, 14 by ensuring that the animal cannot move the straps in an attempt to step out of the boots.

In another embodiment of the invention illustrated in FIG. 6, the paw coverings 10 may also include a ring 40 attached to an end of the connecting strap 38. Alternatively, the ring 40 may also be attached to one strap in the first or second set of straps 24, 28. The ring 40 may be attached to a collar (not shown) worn by the animal 18, such as a flea collar or identification collar, to further secure the paw coverings by preventing removal of the straps by the animal over its head. That is, the collar may be threaded through the ring 40. Alternatively, the ring 40 would be replaced by other fasteners readily known to those of skill in the art to secure the covering 10 to an animal collar.

Another embodiment of the invention is illustrated in FIG. 7, wherein an inner strap 42 is attached to and connects the boots 12, 14. When worn, the strap 42 extends across the chest area of the animal, between the animal's front legs. Yet another alternative embodiment illustrated in FIG. 8 provides a cross strap 44 which extends across the chest area of the animal, just below the neck region. The cross strap 44 is attached at its ends to the strips 32, 36 of the two sets of straps 24, 28. In yet another embodiment, both straps 42, 44 may be included in the paw coverings 10 of the present invention. However, only one of the straps 42, 44 need be used to assist in securing the harness 23 on the animal, as will be understood by those of skill in the art.

The straps 42, 44 should have a length sufficient to allow substantially a full range of motion of the front paws 16 of the animal 18, yet provide additional stability of the harness 23 on the animal, thereby maintaining the boots 12, 14 on the animal. Preferably, the straps 42, 44 are sewn in place and comprise a single section of a durable material such as nylon or canvas. Alternatively, the straps 42, 44 may be formed of a first section of hook material which engages a second section of loop material, in a manner similar to the attachment of the straps 24, 28 to each other, thereby providing adjustability of the straps 42, 44.

Although this invention is described in terms of certain preferred embodiments, other embodiments that are apparent to those of ordinary skill in the art are also within the scope of this invention. Accordingly, the scope of the invention is intended to be defined only by the claims which follow.

What is claimed is:

1. A method of utilizing a covering for protecting animal paws and preventing damage caused by the paws, said method comprising the steps of:

placing a first paw of an animal in a first boot, said first boot having first and second straps attached thereto;

placing a second paw of the animal in a second boot, said second boot having third and fourth straps attached thereto;

securing said first and third straps;

securing said second and fourth straps, whereby the animal may not remove said first and second boots when said straps are secured; and attaching said covering to a collar worn around the neck of the animal.

2. The method of claim 1, wherein said attaching step comprises threading a collar through a ring attached to said covering.

3. The method of claim 1, wherein said placing steps precede said attaching step.

4. The method of claim 1, wherein said attaching step is preceded by said securing steps.

* * * * *